United States Patent [19]

Amyot

[11] Patent Number: 5,458,345

[45] Date of Patent: Oct. 17, 1995

[54] TOOL-HOLDER CHUCK FOR EQUIPPING A ROTATING MACHINE, SUCH AS A DRILL

[75] Inventor: Claude V. L. Amyot, Doubs, France

[73] Assignee: Etablissements Amoyt S.A., Pontarlier, France

[21] Appl. No.: 212,841

[22] Filed: Mar. 15, 1994

[30] Foreign Application Priority Data

Mar. 26, 1993 [FR] France .................................. 93 03802

[51] Int. Cl.⁶ ...................................................... B23B 31/12
[52] U.S. Cl. ........................ 279/62; 279/140; 279/902
[58] Field of Search ................................ 279/60–65, 140, 279/902

[56] References Cited

U.S. PATENT DOCUMENTS

| | | | |
|---|---|---|---|
| 573,189 | 12/1896 | Vogel | 279/62 |
| 3,970,323 | 7/1976 | Schnizler, Jr. | 279/64 |
| 4,213,623 | 7/1980 | Rohm | 279/60 |
| 4,302,021 | 11/1981 | Rohm | |
| 4,583,751 | 4/1986 | Rohm | |
| 5,044,643 | 9/1991 | Nakamura | |
| 5,145,192 | 9/1992 | Rohm | |
| 5,145,193 | 9/1992 | Rohm | |

FOREIGN PATENT DOCUMENTS

| | | |
|---|---|---|
| 0017748 | 10/1980 | European Pat. Off. |
| 0151791 | 8/1985 | European Pat. Off. |
| 0300375 | 1/1989 | European Pat. Off. |
| 0468128 | 1/1992 | European Pat. Off. |
| 0468157 | 1/1992 | European Pat. Off. |
| 0519412 | 12/1992 | European Pat. Off. |

*Primary Examiner*—Steven C. Bishop
*Attorney, Agent, or Firm*—Oliff & Berridge

[57] ABSTRACT

In this chuck, the body is equipped, in its zone overlapped by the sleeve, with peripheral toothing, whereas the sleeve includes a shaped locking member which, intended to be engaged in the toothing of the body in the tightened position of the chuck, is actuated by a ring mounted so that it can pivot on the front end of the body of the chuck.

9 Claims, 3 Drawing Sheets

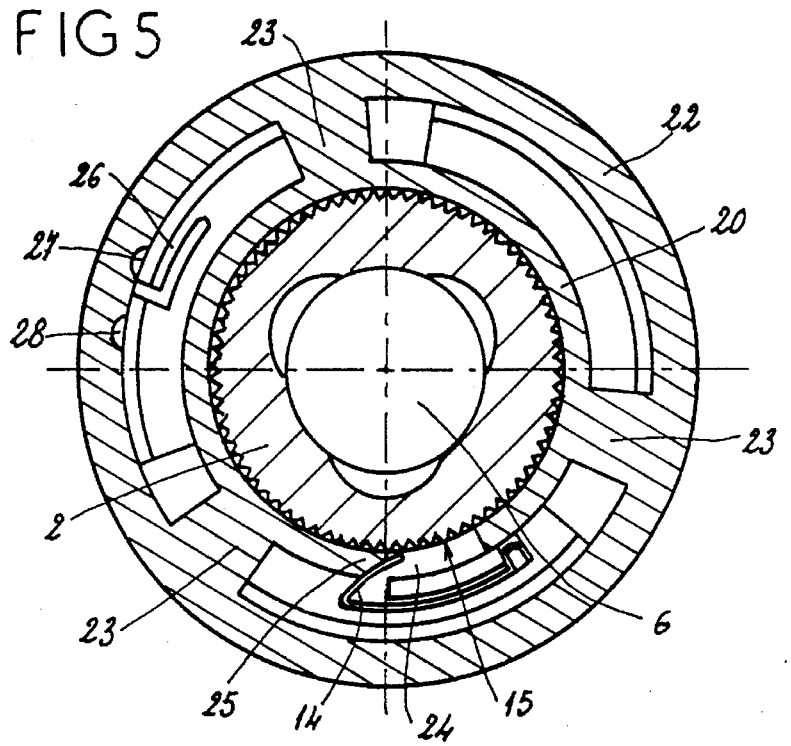
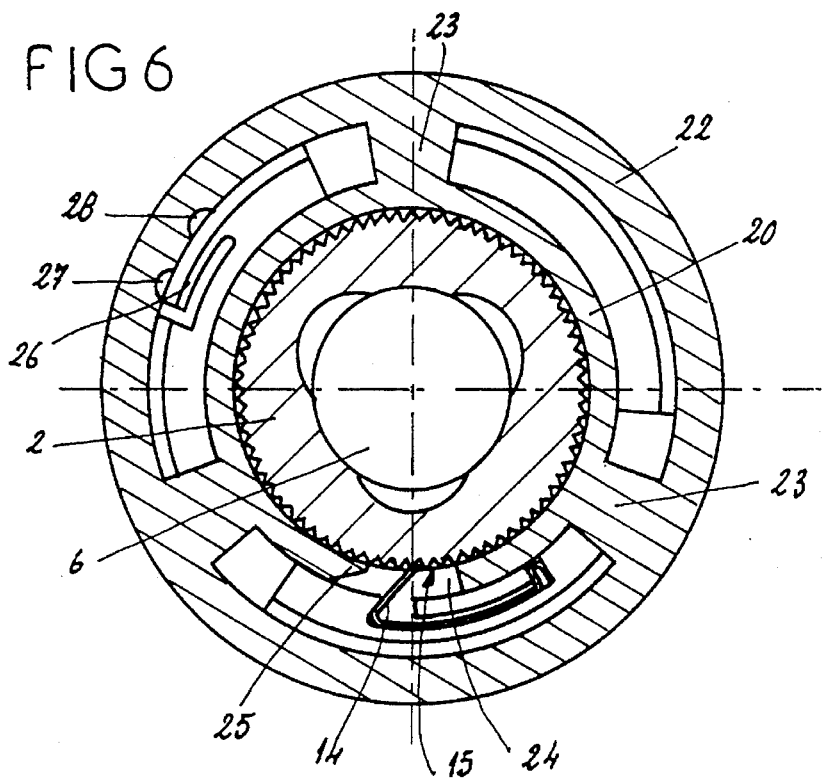

TOOL-HOLDER CHUCK FOR EQUIPPING A ROTATING MACHINE, SUCH AS A DRILL

The subject of the present invention is a tool-holder chuck for equipping a rotating machine, such as a drill.

BACKGROUND OF THE INVENTION

Chucks are most often used for the fixing, vis-`a-vis a driveshaft, either of a bore bit or drill bit, or of a screwdriver end. A first possibility for fixing the cylindrical shank of a tool to the chuck consists in equipping the latter with a rack system which, with the aid of a key, tightens the jaws onto the tool before the machine is used. The rack provides rotational entrainment, with respect to the body, of a sleeve surrounding the latter, on the inner face of which is fixed a nut, the internal screw thread of which interacts with the external screw thread of the jaws. Although this solution gives satisfaction from a practical point of view, it exhibits the drawback of requiring the use of a key which is often mislaid by the user. This use of a key is all the more restrictive in so-called cordless drills, that is to say ones which are powered by batteries forming an integral part of the body of the machine which gives them very great mobility. These cordless machines or drills are generally equipped with key-type chucks for holding tools. This type of chuck allows use in both directions of rotation, and the passage of an axial screw for blocking the chuck on the spindle of the drill when the direction of rotation of the driveshaft tends to favor the unscrewing of the chuck vis-`a-vis the driveshaft. Chucks do exist which allow satisfactory clamping of the tool without requiring the use of a key.

A first known solution consists in forming, at the rear end of the sleeve for rotational entrainment of the nut for actuating the jaws, several teeth, a ring mounted concentrically on the body being held axially away from the sleeve under the action of a spring including at least one tooth opposite the sleeve. This ring is mounted so that it can rotate freely around the body.

In practice, in order to clamp or release the tool, it is appropriate for the user to grasp hold of the ring and move it forward, so that the teeth in this ring come into mesh with the teeth in the sleeve, at the same time as he causes the rotation of the body of the chuck, from the driveshaft, in one direction or the other. A relative rotational movement of the antagonistic teeth of the ring and of the sleeve is produced, giving rise to a series of impacts promoting the tightening or loosening of the jaws, depending on the envisaged direction of rotation.

In another known chuck, the sleeve exhibits, at its front end, a part in the form of a radial collar from which there project several notches pointing toward the rear. Moreover, a ring including notches pointing forward, and intended to come into mesh with the notches which the sleeve includes is forcibly fitted over the nut for actuating the jaws.

A spring bearing on the body of the chuck holds the notches of the ring and of the sleeve, respectively, in mesh, as long as a certain load is not reached.

In practice, it is sufficient for the user, in order to tighten or loosen the jaws, manually to block the sleeve in terms of rotation and to actuate the driveshaft in one direction or the other. This results in a series of impacts exerted by the notches of the ring against the notches of the sleeve, promoting tightening or loosening, depending on the case.

However, these two known chucks have a complicated structure which leads to a high cost price and a very significant bulk.

Another solution is provided in document EP-A-0,300,375 which relates to a chuck using a very fine pitch thread for the jaws, and a series of balls located between the nut and the body, this latter characteristic, namely the interposition of the balls between the nut and the body, already being known in industrial chucks. The chuck described in this document exhibits the drawback of not possessing perfect non-loosenability characteristics, and of being very tricky to operate both for tightening and for loosening, accounting for the fineness of the pitch and, finally, of requiring a large outer diameter of the chuck in order to obtain good clamping.

Self-tightening chucks including an inner thrust ball bearing exhibit the drawback of not being able to be used in left-handed rotation, of not allowing the passage of a central screw for blocking the chuck onto the spindle of the machine, and of working loose under heavy vibrations during hammering works.

The devices described previously do not, however, give satisfaction in the case of high-performance machines which require mechanical locking which prevents the chuck from opening, especially during hammering works.

SUMMARY OF THE INVENTION

The object of the invention is to provide a tool-holder chuck of simple design, which can be produced with lightweight materials, particularly incorporating a certain number of components made of synthetic material, which has a mechanism for locking in the working position, this mechanism being of a simple design and simple implementation.

To this end, the chuck to which it relates, of the type comprising a body fixed to the driveshaft of the machine, in which are mounted several jaws sliding in bores and converging toward the front, the body being secured, in its rear part, to an immobilizing ring, in front of which is pivotably mounted on the body a sleeve, the internal wall of which is secured to a nut in mesh with the screw-threaded outer part of the jaws, is one wherein the body is equipped, in its zone overlapped by the sleeve, with peripheral toothing, whereas the sleeve includes a shaped locking member which, intended to be engaged in the toothing of the body in the tightened position of the chuck, is actuated by a ring mounted so that it can pivot on the front end of the body of the chuck.

Since the chuck is actuated manually, by operating the sleeve, both for opening and for closing, it is sufficient, at the end of closure, to actuate the ring in order to perform the locking and, prior to opening the chuck, to actuate the ring in order to perform the unlocking.

According to one embodiment, the toothing formed on the body is straight-cut toothing, whereas the locking member consists of a flat spring, shaped in a way which is inclined with respect to the perpendicular to the teeth when no action is exerted on it.

Advantageously, the flat spring projects inward, into a hollowed-out part which the sleeve includes, in which hollowed-out part can move a shaped tongue secured to the ring and intended, in an extreme angular position, to bear against the spring in order to disengage it from the toothing.

According to another characteristic of the invention, the sleeve includes, emerging in its forward-pointing face, several recesses which are centered on the axis of the chuck, inside each of which is engaged a finger which, secured to the ring, has a length less than that of the corresponding recess, this length being considered in the direction of the circular arc along which this recess extends.

The difference in length between each recess in the sleeve and the corresponding finger of the ring determines the rotational travel of which the ring is capable, vis-`a-vis the sleeve.

Advantageously, the sleeve includes, in its part situated facing the ring, an elastic tongue, the free end of which is equipped with a shaped part, whereas the ring includes two notches which, spaced apart from one another by an amount equal to the rotational travel of the ring with respect to the sleeve, that is to say to the difference in length between a recess in the sleeve and the corresponding finger of the ring, are intended to receive the shaped part in the two end-of-travel positions of the ring.

This arrangement makes it possible to ensure the elastic blocking of the ring vis-`a-vis the sleeve, in its two end positions.

According to one possibility, the ring includes a tubular extension overlapping the sleeve over a significant part of its length. In this case, the chuck is actuated by direct operation on the ring during all of the clamping and all of the releasing of the tool.

In order to ensure axial blocking of the sleeve and of the ring on the body, the body comprises, close to its front end, an annular groove which is bounded, on the front end side of the body, by a surface which is perpendicular to the axis of the chuck, whereas the ring includes a tapered collar which is engaged in the groove of the body, in the mounted position of the chuck.

According to an embodiment variant, the body comprises, in proximity to its front end, an annular groove which is bounded, on the front end side of the body, by a surface which is perpendicular to the axis of the chuck, whereas the ring includes, at its front end, a plurality of elastic tongues which are intended to be engaged in the groove of the body, in the mounted position of the chuck.

BRIEF DESCRIPTION OF THE DRAWINGS

In any case, the invention will be clearly understood with the aid of the description which follows, with reference to the appended diagrammatic drawings representing, by way of non-limiting examples, two embodiments of this chuck:

FIG. 3 is an exploded view in perspective of the main components of the embodiment of FIG. 1;

FIG. 4 is a view in perspective, from the inside, of the ring located at the front end of the chuck according to the first embodiment;

FIGS. 5 and 6 are cross-sectional views taken along line V—V of FIG. 2, of the chuck in the locked position and in the unlocked position;

FIG. 7 is a view in perspective of an embodiment variant of the ring located at the front end of the chuck;

DESCRIPTION OF THE PREFERRED EMBODIMENTS

Figure 1:
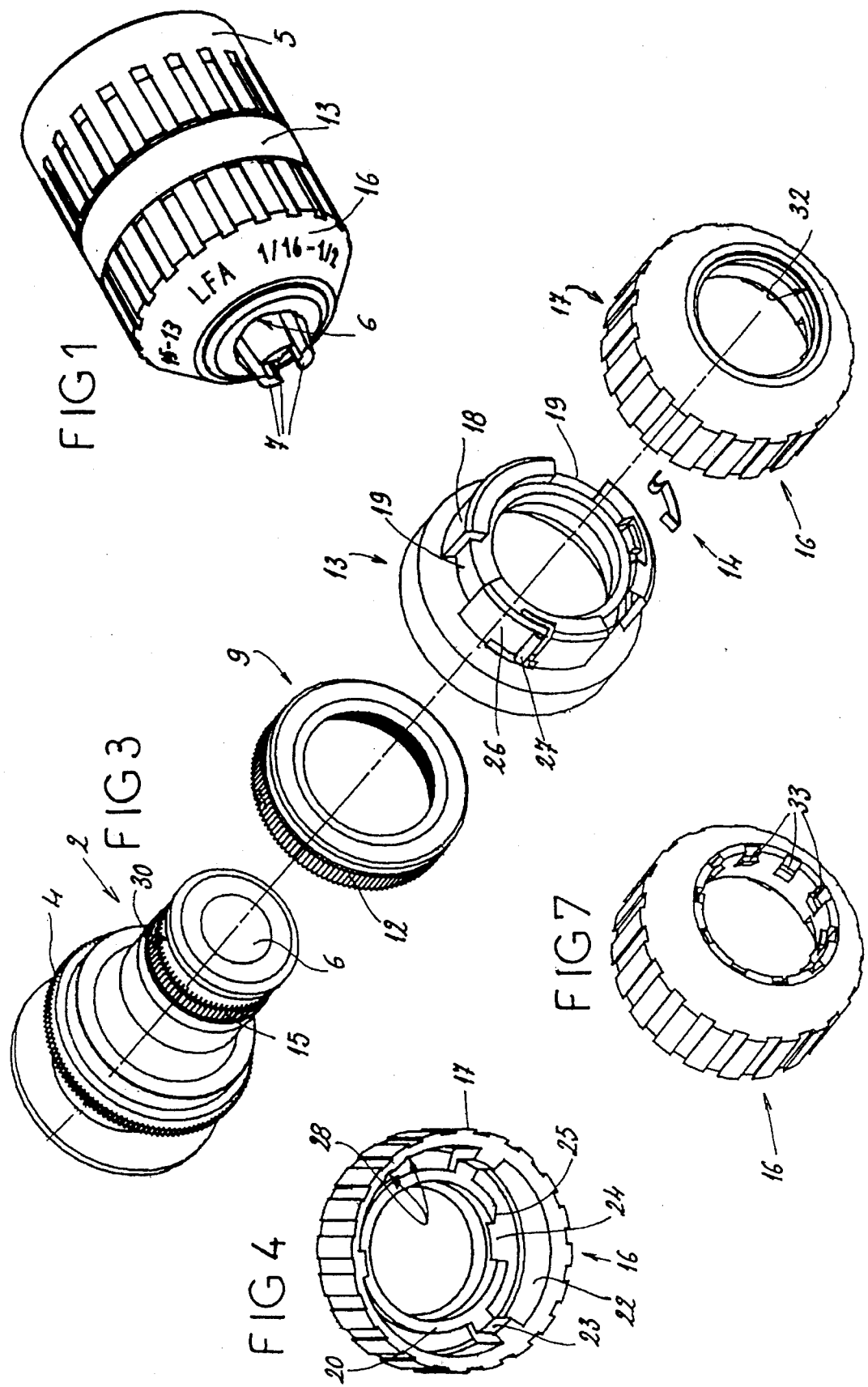
FIG. 1 is a perspective view of a chuck according to a first embodiment of the invention.
Figure 2:
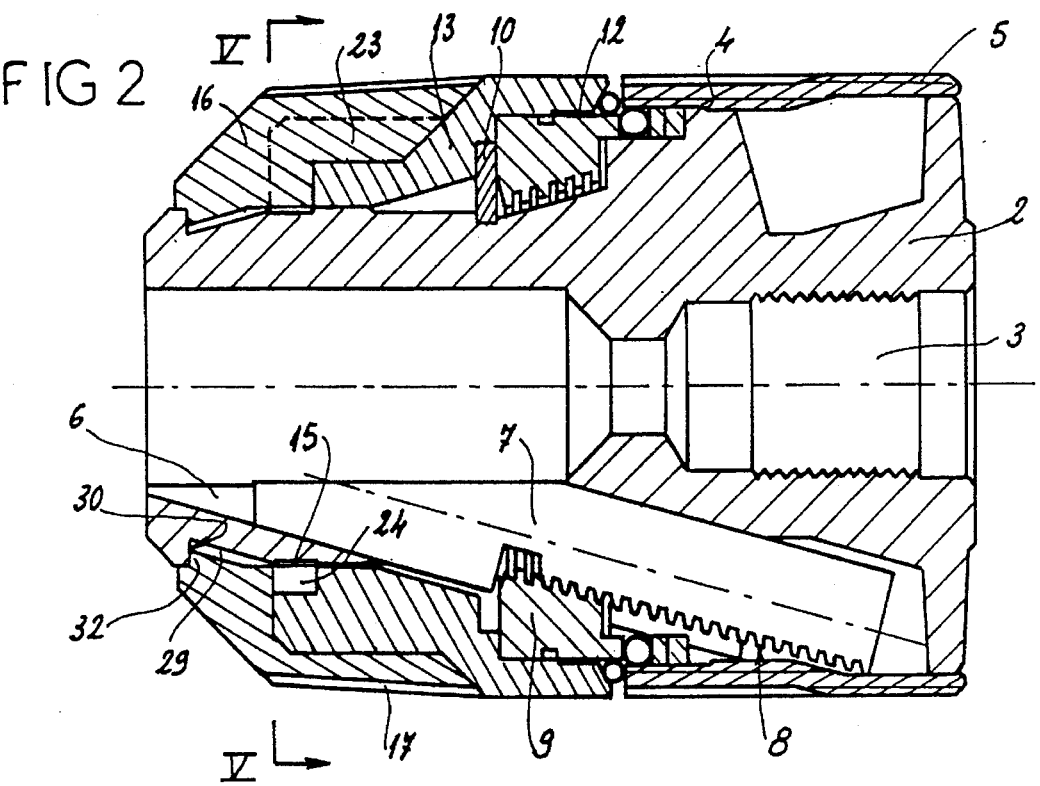
FIG. 2 is a longitudinal cross-sectional view of the embodiment of FIG. 1.

The chuck, according to a first embodiment of the invention, and comprises a body 2 in the rear wall of which there emerges a tapped hole 3 intended to fix it onto the threaded shaft of a rotating machine, not represented in the drawing. In its rear part, the body 2 includes a zone 4 exhibiting straight-cut knurling intended to perform the blocking of the immobilization ring 5, which is made of synthetic material, in terms of rotation.

In the body 2 are formed three bores 6, each one serving to guide one jaw 7. The bores converge toward the front, such that the displacement of the jaws toward the front is manifested in these jaws moving closer together, allowing a tool, not represented in the drawing, to be clamped.

The outer part of the jaws 7 includes a screw thread 8 interacting with a tapped nut 9 in order to displace the jaws in one direction or the other depending on the direction of rotational entrainment of the nut 9. This nut 9 is axially blocked by a circlip 10. The nut 9 includes straight-cut knurling 12 allowing the sleeve 13, made of synthetic material and also indexed for rotationally blocking the latter, to be mounted. In proximity to its front end the sleeve 13 is equipped with a locking member 14 consisting of a flat spring, in the form of a hairpin, intended to interact with toothing 15 formed on the body. This toothing 15 is straight-cut toothing and the free end of the spring 14 is inclined by approximately 45° with respect to a direction perpendicular to the teeth 15. The front end of the body 2 is also equipped with a ring 16, with partial interpenetration of the ring and of the sleeve, and overlap of the sleeve by the ring over a relatively significant length of the sleeve and by virtue of a part 17 in the form of a skirt, which the ring 16 includes.

The sleeve 13 exhibits, projecting from the front side, a cylindrical part 18 which is interrupted by three recesses 19 located according to an even angular distribution. The ring 16 exhibits, for its part, two concentric annular surfaces, namely a first annular surface 20 intended to be situated inside the tubular part 18 of the sleeve 13, and an annular part 22 intended to be situated outside the annular part 18 of the sleeve. The annular parts 20 and 22 are Joined together by three solid radial parts 23, in the form of fingers, each one having a length less than that of the recesses 19, the difference in length, considered in the peripheral direction, between a recess 19 and a finger 23 corresponding to the angular travel of the ring 16 vis-`a-vis the sleeve 13.

The inner annular part 20 of the ring includes an opening 24 allowing the passage of the flat spring 14 of the sleeve 13. One of the ends of this opening 24 is bounded by a tongue 25 intended to bear on the flat spring 14 in order to cause it to tilt from the inside toward the outside, and to disengage it from the toothing 15.

Furthermore, the sleeve 13 exhibits, in its tubular part 18 situated facing the ring, an elastic tongue 26 the end 27 of which is shaped and is intended to penetrate into one or other of two notches 28 formed in the annular part 22 of the ring in the two end-of-travel positions of the latter.

Finally, the body 2 includes, in proximity to its front end, an annular groove 29 which is bounded, on the front end side of the body, by a surface 30 substantially perpendicular to the axis of the chuck. The ring 16 exhibits, for its part, a tapered collar 32 engaged in the groove of the body, in the mounted position of the chuck, thus providing the blocking of the ring and of the sleeve which is associated with it, in terms of rotation.

When the spring 14 is in the position in which it is disengaged from the toothing 15, as shown in FIG. 5, it is possible to clamp or release the tool by pivoting the sleeve 13, and consequently the nut 9 for entraining the jaws 7. In contrast, when the free end of the spring 4 is engaged in the toothing 15, as shown in FIG. 6, the pivoting of the sleeve about the body is rendered impossible under the sole action of the vibrations resulting from the operation of the machine and from the working of the tool.

In practice, the implementation of the chuck, represented in FIGS. 1 to 6, is as follows. With the jaws 7 in the separated position, and the ring 16 located in the position represented in FIG. 5, one proceeds with rotationally entraining ring 16, which entrains the sleeve 13 via the tongue end 27 engaged in a notch 28 of the ring. When the jaws are in contact with the tool, the resistance of the nut 9 and of the sleeve 13 increases. A rotation of the ring 16 with respect to the sleeve 13 is then produced, within the limit allowed by the difference in length between the recesses 19 and the fingers 23. During this relative rotation of the ring 16 with respect to the sleeve 13, the tongue end 27 changes notch 28, and the tongue 25 becomes non-obstructing and releases the spring 14, the ring 16 pushing the sleeve 13 via the three fingers 23. The chuck is then tightened.

For loosening, the operator proceeds in the opposite way, by rotating the ring 16 in the counterclockwise direction. First of all there is a relative rotation of the ring 16 with respect to the sleeve 13, during which movement the end 27 passes from one notch to the other, and the tongue 25 comes to bear on the spring 14 in order to separate it from the toothing 15. By continuing this opening movement in the counterclockwise direction, the operator entrains the sleeve 13 via the fingers 23. The chuck then opens because the sleeve 13 entrains the nut 9 which urges the jaws into the open position.

Figure 8:
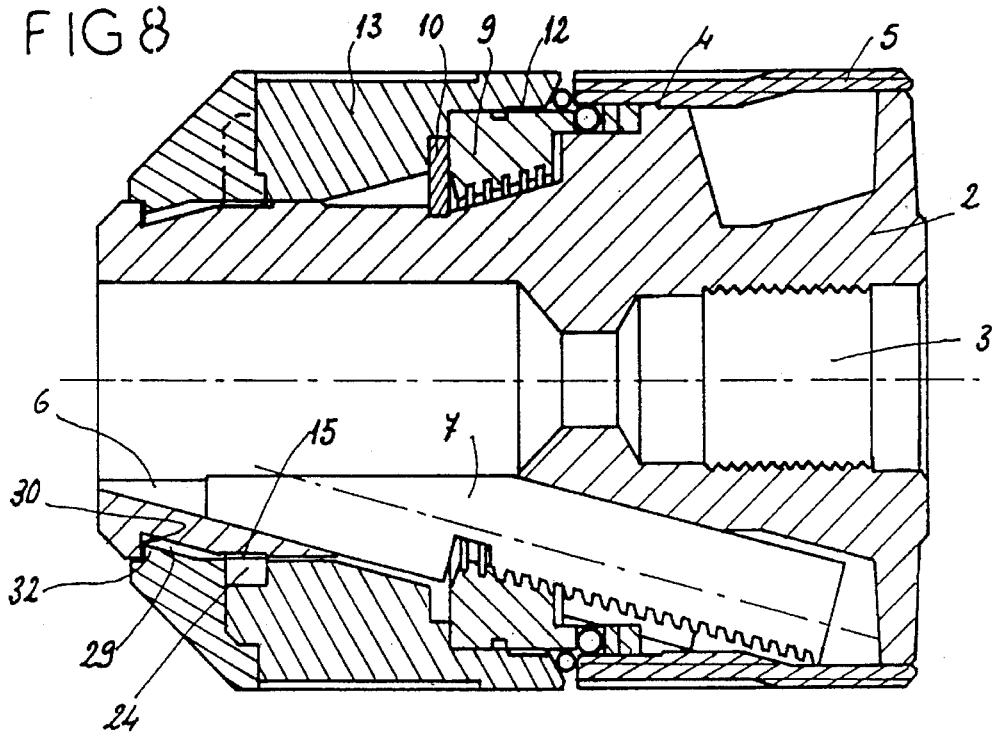
FIG. 8 is a longitudinal cross-sectional view, similar to FIG. 2, of another embodiment of the chuck.

FIG. 8 represents an embodiment variant in which the same elements are denoted by the same references as before. In this view, there is just an interpenetration of the facing faces of the sleeve 13 and of the ring 16. It is therefore appropriate, in order to entrain the nut 9 in terms of rotation, to act directly on the sleeve 13, the ring 16 being actuated only at the end of tightening or at the beginning of loosening in order, respectively, to perform the locking and the unlocking of the chuck.

Furthermore, in the embodiment represented in FIG. 7, the tapered collar 32 which the ring 16 includes for the purpose of axial immobilization of the sleeve and of the ring, has been replaced by a plurality of tongues 33, evenly distributed around the ring, possessing elastic characteristics and allowing irreversible mounting of the ring on the body 2 of the chuck.

As emerges from the foregoing, the invention affords a great improvement to the existing art, by providing a chuck of simple structure, having use of a mechanical device for locking in the position of use, and which is very simple for the user to implement.

I claim:

1. A tool-holder chuck for a rotating machine, comprising:

a body fixable to a driveshaft of the machine and having front and rear portions, the body having a plurality of bores formed therein and peripheral toothing formed thereon;

a plurality of jaws slidably mounted in the bores and converging toward the front portion, wherein each jaw has a screw-threaded outer portion;

an immobilizing ring secured to the rear portion;

a nut in mesh with the screw-threaded outer portions of the jaws;

a ring pivotably mounted to the front portion; and a sleeve pivotably mounted on the body, the sleeve having an internal wall secured to the nut and a locking member, the locking member being actuated by pivotal movement of the ring mounted to the front portion, wherein the locking member is engaged with the peripheral toothing of the body when the chuck is in a tightened position.

2. The chuck of claim 1, wherein the peripheral toothing formed on the body comprises straight-cut toothing and the locking member comprises a flat spring having a free end, the free end being inclined with respect to a direction perpendicular to the teeth.

3. The chuck of claim 2, wherein the sleeve includes a hollowed-out part, the flat spring projecting into the hollowed-out part, the ring includes a shaped tongue movable into the hollowed-out part, the shaped tongue being adapted to bear against the spring to disengage the spring from the toothing when the tongue is in a first position.

4. The chuck of claim 1, wherein the sleeve includes a plurality of recesses centered about an axis of the chuck, the ring mounted to the front portion comprising a plurality of fingers on an inner surface thereof, wherein each finger is positioned in a respective recess of the sleeve.

5. The chuck of claim 4, wherein the sleeve further includes an elastic tongue having a free end, the free end having an engaging portion, the ring mounted to the front portion further comprising two notches for receiving the engaging portion, the two notches being spaced apart by an amount equal to the difference in lengths between one of the recesses in the sleeve and its corresponding finger of the ring.

6. The chuck of claim 1, wherein the ring mounted to the front portion is located at an end of the sleeve, the ring and sleeve having opposing, interpenetrated ends.

7. The chuck of claim 6, wherein the ring mounted to the front portion includes a tubular extension overlapping the sleeve.

8. The chuck of claim 1, wherein the body comprises, at the front portion, an annular groove, and the ring comprises a tapered collar engaged in the groove.

9. The chuck of claim 1, wherein the body comprises at the front portion an annular groove, and the ring comprises a plurality of elastic tongues engaged in the groove.

* * * * *